United States Patent [19]
Warner et al.

[11] Patent Number: 4,458,068
[45] Date of Patent: Jul. 3, 1984

[54] WATER-SOLUBLE, TERNARY CELLULOSE ETHERS

[75] Inventors: Patricia A. Warner, Denham Springs, La.; George K. Greminger, Midland, Mich.; Clark W. Gibson, Denham Springs, La.

[73] Assignee: The Dow Chemical Company, Midland, Mich.

[21] Appl. No.: 478,744

[22] Filed: Mar. 25, 1983

[51] Int. Cl.$^3$ ..................... C08B 11/08; C08B 11/193
[52] U.S. Cl. ...................................... 536/91; 106/170; 524/733
[58] Field of Search ................................... 536/91, 90

[56] References Cited

U.S. PATENT DOCUMENTS

| | | | |
|---|---|---|---|
| 3,873,518 | 3/1975 | Strange et al. | 536/91 |
| 3,879,365 | 4/1975 | Greminger et al. | 536/91 |
| 4,243,802 | 1/1981 | Landoll | 536/91 |

Primary Examiner—Ronald W. Griffin

[57] ABSTRACT

Novel ternary hydroxyethylhydroxypropylmethylcellulose ethers are disclosed. These ethers have lower cloud points than most cellulose ethers having hydroxyethoxyl substitution and exhibit return cloud points which are approximately the same as their cloud points.

6 Claims, No Drawings

WATER-SOLUBLE, TERNARY CELLULOSE ETHERS

BACKGROUND OF THE INVENTION

This invention relates to water-soluble, ternary cellulose ethers.

It is well known that the presence of hydroxyethoxyl substitution increases the hydrophilic character of cellulose ethers. Unfortunately, however, the presence of such hydroxyethoxyl substitution also generally raises the gel or cloud point of the cellulose ether. For example, water-soluble methylcellulose ethers generally exhibit cloud points in the range from about 40°–70° C. However, the addition of hydroxyethoxyl substitution thereto often increases the gel point of the resulting hydroxyethylmethylcellulose above the boiling point of water. Similarly, in U.S. Pat. No. 3,873,518 a water-soluble, ternary hydroxyethylhydroxypropylmethylcellulose ether (HEHPMC) is disclosed having high hydroxyethyl and hydroxypropyl contents. The cloud points of these ternary ethers are in excess of 70° C. and are often above 80° C. By contrast, corresponding hydroxypropylmethylcellulose ethers having similar hydroxypropoxyl and methoxyl content as those HEHPMCs exhibit cloud points in the range from about 50°–65° C. Thus it is seen that the addition of hydroxyethoxyl substitution substantially increases the cloud point of the cellulose ether.

In many applications it would be desirable to have a cellulose ether having the advantages of hydroxyethoxyl substitution which also exhibits a cloud point comparable with those methylcellulose and hydroxypropylmethylcellulose (HPMC). For example, in suspension polymerization processes, water-soluble cellulose ethers, such as HPMC and methylcellulose are employed as protective colloids. The utility of such cellulose ethers in such polymerization processes depends on their insolubility in water above temperatures in the range from about 50°–70° C. A hydroxyethoxyl substituted cellulose ether having a cloud point within such a range would be useful as a protective colloid in suspension polymerization processes.

Another characteristic of conventional cellulose ethers which exhibit a gel point such as methylcellulose and hydroxypropylmethylcellulose is that the temperature at which they precipitate in solutions of water upon heating is much higher than the temperature at which they redissolve upon cooling. In many conventional cellulose ethers, the difference between the cloud point (i.e., the temperature at which it becomes insoluble upon heating in aqueous solution thereof) and the return cloud point (i.e., the temperature at which the cellulose ether redissolves upon cooling) is in the range from about 15°–35° C. The existance of this so-called "hysteresis loop" often presents disadvantages in the use of these cellulose ethers. For example, it is often desirable to dissolve cellulose ethers in water by dispersing cellulose ether in hot water and then cooling the dispersion below the return cloud point of the cellulose ether. Due to the hysteresis loop, it is necessary to cool the dispersion far below the nominal cloud point of the cellulose ether. Often, the cooled solution must then be reheated somewhat to be suitable for its intended use. Reduction of this hysteresis loop would eliminate the need for excess cooling and reheating of such solutions, and would result in a reduction of time and energy necessary to use cellulose ether solutions.

Accordingly, a cellulose ether having hydroxyethoxyl substitution which has a cloud point comparable to conventional methylcellulose and HPMC ethers would be desired. In addition, a cellulose ether having hydroxyethoxyl substitution which exhibits a significantly reduced hysteresis loop as compared to most conventional cellulose ethers would also be highly desirable.

SUMMARY OF THE INVENTION

This invention is such a novel cellulose ether. The cellulose ether of this invention is a ternary hydroxyethylhydroxypropylmethylcellulose characterized in having a methoxyl degree of substitution of about 0.9–2.1, a hydroxyethoxyl molar substitution of about 0.2–0.5, and a hydroxypropoxyl molar substitution of about 0.1–0.4. These novel ternary cellulose ethers exhibit cloud points which are surprisingly low for hydroxyethoxy substituted cellulose ethers. The cloud points of the ternary cellulose ethers of this invention are not significantly higher than corresponding hydroxypropylmethylcellulose ethers having similar hydroxypropoxyl and methoxyl contents. Also surprising is that the ternary cellulose ethers of this invention exhibit a substantially reduced hysteresis loop as compared with conventional cellulose ethers at similar levels of substitution. Generally, the difference between the cloud points and the return cloud points of the cellulose ethers of this invention is less than 10° C.

DETAILED DESCRIPTION OF THE INVENTION

The "cloud point" of a water-soluble cellulose ether is that temperature at which the cellulose ether becomes insoluble upon heating an aqueous solution thereof. The method employed herein to determine cloud point is to heat a 2 weight percent aqueous solution of the cellulose ether at the rate of about 0.5° C. per minute and measuring the transmission of light therethrough. The temperature at which the transmission of light is reduced by 50 percent is the cloud point.

The "return cloud point" of the cellulose ether is the temperature at which a cellulose ether will dissolve in water upon cooling an aqueous dispersion containing 2 weight percent thereof, which dispersion is originally heated above the cloud point of the cellulose ether. For the purpose of this invention, cloud points are determined by cooling an aqueous dispersion containing 2 weight percent of the cellulose ether at the rate of about 0.5° C. per minute and measuring the transmission of light therethrough. The cloud point is that temperature at which the transmission of light through the solution is 50 percent of the transmission of light through a fully dissolved solution.

The ternary cellulose ethers of this invention exhibit a return cloud point which is generally less than 15° C. lower than the cloud point. Generally, the return cloud point is within 10° C. of the cloud point and most preferably is within 5° C. of the cloud point of the cellulose ether. The hydroxyethylhydroxypropylmethylcellulose (HEHPMC) of this invention is characterized in having a methoxyl degree of substitution (MDS) of about 0.9–2.1, preferably about 1.25–2.0; a hydroxyethoxyl molar substitution (HEMS) of about 0.2–0.5; and a hydroxypropoxyl molar substitution (HPMS) of 0.1–0.4, preferably 0.1–0.3. It has been found that the cellulose ethers within the foregoing ranges of substitution have unexpectedly low cloud points and significantly reduced hysteresis loops.

The term "methoxyl degree of substitution (MDS) refers to the average number of hydroxyl groups on each anhydroglucose unit of the cellulose molecule which are replaced with methoxyl groups. Since there are three hydroxyl groups on each anhydroglucose unit, the MDS may, in theory, range from 0–3. In the HEHPMCs of this invention, the MDS is in the range from 0.9–2.1, preferably 1.25–2.0.

The terms "hydroxyethoxyl molar substitution (HEMS)" and "hydroxypropoxyl molar substitution (HPMS)" refer to the average number of moles of ethylene oxide and propylene oxide, respectively, which are reacted with each anhydroglucose unit of the cellulose molecule.

Note that since each time a hydroxypropoxyl or hydroxyethoxyl group is added to the cellulose molecule, a new hydroxyl group is formed which itself is capable of being hydroxyalkylated. Accordingly, not all hydroxypropoxyl and hydroxylethoxyl groups are necessarily added directly to the cellulose backbone, but side polyether chains may be formed instead. In this invention, the HPMS is in the range from about 0.1–0.4, preferably 0.1–0.3, and the HEMS is from about 0.2–0.5.

The cellulose ethers of this invention typically have cloud points less than 70° C. In general, the cloud points of the cellulose ethers of this invention are not signicantly higher than those of hydroxypropylmethylcellulose (HPMC) which have similar hydroxypropoxyl and methoxyl contents. Often, the cloud point of the ternary ethers is actually equal to or slightly less than that of the corresponding hydroxypropylmethylcellulose ethers. This result is highly surprising in that increased hydroxyalkyl substitution, in particular increased hydroxyethyl substitution, is generally considered to increase the cloud point of a cellulose ether. For example, many hydroxyethylmethylcellulose ethers do not become insoluble at any temperature below the boiling point of water. The hydroxyethylhydroxypropylmethylcellulose ethers disclosed in U.S. Pat. No. 3,873,518 have cloud points in excess of 70° C. and, more significantly, have cloud points which are about 10°–20° C. higher than those of HPMCs having similar hydroxypropoxyl and methoxyl contents.

The HEHPMC of this invention may be within a wide range of molecular weights. The molecular weights of a water-soluble cellulose ether is generally expressed as the viscosity at 20° C. of an aqueous solution containing 2 weight percent of the cellulose ether (2 percent solution viscosity). The 2 percent solution viscosity of the cellulose ethers of this invention may range from less than about 10 cps to 100,000 cps or above. Higher viscosity ternary cellulose ethers are advantageously prepared by employing higher molecular weight cellulose pulp as the starting material and employing reaction conditions, such as absence of air, which minimize the degradation of the pulp during the etherification reaction and subsequent processing. Low viscosity ternary cellulose ethers are advantageously prepared using known techniques for degrading the cellulose molecule, such as exposure of alkali cellulose to high temperatures, air, ozone, bleach, peroxides, or other oxidizing agents, and by other known methods.

The hydroxyethylhydroxypropylmethylcellulose of this invention is advantageously prepared by the reaction of methyl chloride, propylene oxide and ethylene oxide with alkali cellulose in a pressure reactor in the absence of air at about 30°–80° C. Table I shows the operable and preferred reactant ratios.

TABLE I

| Reactant | REACTANT RATIOS[1] | | | |
|---|---|---|---|---|
| | Parts/Part Cellulose | | Moles/Mole Cellulose | |
| NaOH[2] | 0.35–0.75 | (0.45–0.55) | 1.4–3.0 | (1.8–2.2) |
| MeCl[3] | 1.0–2.0 | (1.5–2.0) | 3.25–6.5 | (4.9–6.5) |
| PO[4] | 0.2–0.8 | (0.3–0.6) | 0.5–2.0 | (0.75–1.5) |
| EO[5] | 0.2–0.6 | (0.3–0.5) | 0.75–2.25 | (1.2–2.9) |

[1]Operative ranges, with preferred ranges in parenthesis.
[2]Sodium hydroxide, calculated as anhydrous sodium hydroxide.
[3]Methyl chloride.
[4]Propylene oxide.
[5]Ethylene oxide.

Alkali cellulose for the process is advantageously prepared by treating cellulose with about 0.35–7.5 parts sodium hydroxide per part cellulose (1.4–3.0 moles sodium hydroxide per mole cellulose) which sodium hydroxide is preferably added as a 35–73 weight percent aqueous solution at about room temperature. A dip tank as described in U.S. Pat. No. 2,949,452, a spray mixer as described by U.S. Pat. No. 2,469,764, or a slurry reactor as described in U.S. Pat. No. 2,131,733, are all suitably employed. Contact with air is generally minimized to reduce the viscosity loss.

The reaction is generally carried out in a pressure reactor in the absence of air. More uniform substitution is achieved when the temperature of the reaction mixture is carefully controlled. Excess methyl chloride is often used as a heat transfer and ebullient cooling agent. Other ebullient diluents such as dimethyl ether or a water-soluble organic liquid, such as isopropanol or tertiarybutanol, can be used to moderate the exothermic reactions.

Because of the greater reactivity of the ethylene oxide, the reactor is generally charged with the major proportion of the methyl chloride and the propylene oxide at room temperature and heated to about 40°–50° C. The ethylene oxide is then added at a rate sufficient to maintain the desired temperature, usually about 45°–60° C. However, the ethylene oxide may be added simultaneously with the methyl chloride and propylene oxide or, alternatively, incremental additions of methyl chloride and propylene oxide may also be used.

When the exothermic hydroxyethylation reaction is completed, the reaction may be finished at about 55°–120° C. The overall reaction time is generally about 4–12 hours. The products are washed with hot water to remove residual salts and other impurities.

The ternary cellulose ethers of this invention may be employed as protective colloids in suspension polymerization processes, particularly the suspension polymerization of vinyl chloride, as well as for those uses where rapid conversion from a gel structure to a soluble state is desired.

The following examples are intended to illustrate the invention but not to limit the scope thereof. Unless indicated, all parts and percentages are by weight. The cellulose ether analyses are by conventional methods as described in ASTM D-1346-64 and D-2363-69.

EXAMPLE

A 7 cubic foot pressure reactor is charged with 10 pounds (lbs.) of ground cellulose floc and the air therein displaced with nitrogen. The reactor is then evacuated and 21 lbs. of 50 weight percent of sodium hydroxide solution is sprayed onto the cellulose with agitation. Then, 4.5 lbs. of propylene oxide and 16 lbs. of methyl chloride are added. This mixture is then heated to 40° C., and 4 lbs. of ethylene oxide are added. The mixture is then heated to 75° C. over a period of 6 hours. The reactor is then cooled and vented. The crude product is washed with hot water to remove residual salts, dried at 65° C. and ground until it all passed through a 30 mesh screen. The methoxyl, hydroxyethoxyl and hydroxypropoxyl substitutions, cloud point, return cloud point of this product are reported as Sample No. A in Table II. HEHPMC Sample Nos. B and C are prepared in like manner and have the properties as described in Table II. Corresponding data for Comparative Sample Nos. 1-C through 5-C are provided for comparison.

TABLE II

| Sample No. | MDS[1] | HPMS[2] | HEMS[3] | Cloud Point (°C.) | Return Cloud Point[4] (°C.) | Hysteresis Loop[5] (°C.) |
|---|---|---|---|---|---|---|
| A | 1.61 | 0.18 | 0.32 | 68 | 64.5 | 3.5 |
| B | 1.38 | 0.11 | 0.29 | 59.5 | 55.5 | 4.0 |
| C | 1.63 | 0.26 | 0.42 | 65.0 | 62.0 | 3.0 |
| 1-C* | 1.73 | 0.15 | — | 65.0 | 44.0 | 21.0 |
| 2-C* | 1.04 | 0.3 | 0.96 | 75 | 73.8 | 1.2 |
| 3-C* | 1.32 | 0.85 | — | 58 | 57 | 1.0 |
| 4-C* | 1.43 | — | 0.09 | 82.5 | 46.5 | 34.0 |
| 5-C* | 1.73 | — | — | 64.0 | 40.0 | 24.0 |

*Not an example of the invention.
[1]Methoxyl degree of substitution.
[2]Hydroxypropoxyl molar substitution.
[3]Hydroxyethoxyl molar substitution.
[4]Cloud point determined by the temperature at which the transmission of light through a 2 percent solution of the sample is reduced by 50 percent. Return cloud point determined upon cooling an aqueous dispersion containing 2 percent of the sample until the transmission of light therethrough is 50 percent that of a fully dissolved solution.
[5]Difference between cloud point and return cloud point.

As can be seen from Table II, Sample Nos. A, B and C all exhibit return cloud points which are 4° C. or less lower than their cloud points. The cloud point of each of the Sample Nos. A, B and C is less than 70° C. That the cloud points of Sample Nos. A, B and C are surprisingly low can be seen by comparing, on the one hand, Sample Nos. A, B and C with Comparative Sample No. 1-C, and on the other hand, Comparative Sample No. 2-C with Comparative Sample No. 3-C. Comparative Sample No. 1-C has methoxyl and hydroxypropoxyl contents similar to those of Comparative Sample Nos. A, B and C. It can be seen that the cloud points of Comparative Sample Nos. A, B and C are not significantly increased by the presence of hydroxyethoxyl substitution and, in one case, is actually reduced. Note also the large hysteresis loop (21° C.) exhibited by Comparative Sample No. 1-C. Comparative Sample Nos. 2-C and 3-C have similar methoxyl and hydroxypropoxyl contents and each exhibits a very small hysteresis loop. However, the presence of hydroxyethoxyl content in Comparative Sample No. 2-C causes it to have a cloud point 17 degrees higher than that of Comparative Sample No. 3-C. By contrast, the presence of hydroxyethoxyl substitution in Sample Nos. A, B and C does not cause any significant increase in the cloud point thereof, as seen when compared to Comparative Sample No. 1-C.

Comparative Sample No. 4-C is a hydroxyethylmethylcellulose ether. Comparative Sample No. 5-C is a methylcellulose having a similar methoxyl substitution as in Comparative Sample No. 4-C. Note how the presence of hydroxyethoxyl substitution in Comparative Sample No. 4-C causes it to have a cloud point about 18 degrees higher than that of Comparative Sample No. 5-C. Both Comparative Sample Nos. 4-C and 5-C exhibit very large hysteresis loops.

What is claimed is:

1. A ternary hydroxyethylhydroxypropylmethylcellulose ether having a methoxyl degree of substitution of about 0.9 to about 2.1, a hydroxyethoxyl molar substitution of about 0.2 to about 0.5, and a hydroxypropoxyl molar substitution of about 0.08 to about 0.4.

2. The ternary cellulose ether of claim 1 wherein the methoxyl degree of substitution is from about 1.25 to about 2 and the hydroxypropoxyl molar substitution is from about 0.1 to about 0.3.

3. The ternary cellulose ether of claim 1 which has a cloud point of 70° C. or less.

4. The ternary cellulose ether of claim 1 having a return cloud point which is no more than 10° C. lower than the cloud point thereof.

5. The ternary cellulose ether of claim 4 having a return cloud point which is no more than 5° C. lower than the cloud point thereof.

6. The ternary cellulose ether of claim 5 having a viscosity at 20° C. as a 2 weight percent solution in the range from 10 to 100,000 cps.

* * * * *